United States Patent [19]

Mennenga

[11] Patent Number: 4,472,962
[45] Date of Patent: Sep. 25, 1984

[54] LOW PRESSURE LEAK DETECTOR

[75] Inventor: Hermann Mennenga, Balzers Fürstentum, Liechtenstein

[73] Assignee: Balzers Aktiengesellschaft, Fürsteiytum, Liechtenstein

[21] Appl. No.: 289,157

[22] Filed: Aug. 3, 1981

[51] Int. Cl.³ .................................... G01M 3/20
[52] U.S. Cl. ............................................ 73/40.7
[58] Field of Search ................................ 73/40.7

[56] References Cited

U.S. PATENT DOCUMENTS 3,616,680 11/1971 Schrader .............................. 73/40.7
3,626,760 12/1971 Briggs et al. ........................ 73/40.7
3,690,151 9/1972 Briggs .................................. 73/40.7

Primary Examiner—S. Clement Swisher
Assistant Examiner—Joseph W. Roskos

[57] ABSTRACT

A leak detector for detecting the presence of a leak in a vacuum vessel exposed on its exterior to a test gas, comprising, a turbo vacuum pump having an inlet connected to a gas sensor for sensing the presence of a test gas and an outlet, a forepump connected to the outlet for receiving gas from the outlet and an intermediate inlet in the turbo vacuum pump connected to the test vessel. When test gas is supplied to the intermediate inlet from the test vessel, indicative of a leak, the test gas flows in counter-current flow to the operating direction of the turbo vacuum pump, to the gas detector, where the test gas is detected.

6 Claims, 1 Drawing Figure

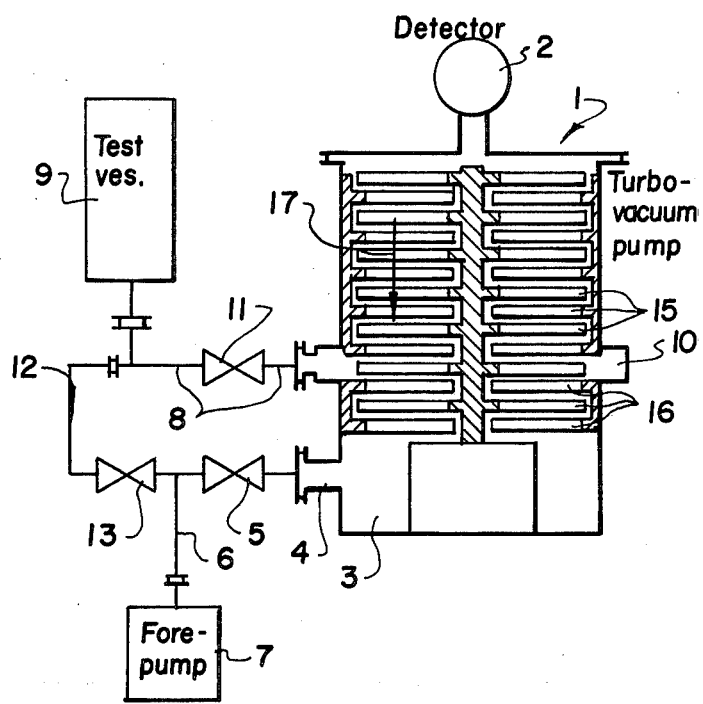

LOW PRESSURE LEAK DETECTOR

FIELD AND BACKGROUND OF THE INVENTION

The present invention relates to leak detectors in general and, in particular, to a new and useful low pressure leak detector which utilizes a turbo vacuum pump, plus a forepump. The turbo vacuum pump is equipped with a gas detector which detects gas flowing in a direction opposite to the operating direction of the turbo vacuum pump, to sense the presence of a leak.

Such leak detectors are known, for example, from German Pat. No. 1,648,648 and Swiss Pat. No. 519,137. They operate on the so-called "couter-current principle". The test gas, having penetrated the vacuum vessel, passes through a supply line to the outlet side of a turbo vacuum pump and against the displacement direction of the pump, to a detector which is connected to the inlet side of the pump and serves to detect the presence of the test gas. An arrangement using a diffusion pump instead of a turbo vacuum pump is known from U.S. Pat. No. 3,690,151.

The prerequisite for a successful application of the counter-current principle is to have a counter-current pump which permits the adjustment of a stable test gas compression factor which is smaller than the compression factor for other gases evacuated from the tested vessel which other gases interfere with the detection of the test gas by the detector. The selected compression factor for the test gas is to be small enough to allow the test gas to penetrate against the pumping direction to the detector and to build up a measurable partial pressure therein. The compression factor for the other gases, on the contrary, should be as high as possible, to minimize their contribution to the interfering background. Turbo vacuum pumps are particularly suitable as counter-current pumps because their compression factor depends on the molecular weight of the kind of gas being pumped.

In prior art arrangements, a disadvantage of systems based on the counter-current principle is that they are relatively expensive since a separate counter-current pump is needed, so that the application of the principle is economically prohibitive in many instances. Still more serious is another disadvantage, namely, that after each peak of the test gas partial pressure in the detector, a relatively long time period is necessary to regain a full detecting sensitivity for following weaker test gas signals. This limitation is mostly due to the fact that the determining factor for evacuating the test gas from the detector and/or the container is substantially only the pumping speed of a forepump used in the system.

SUMMARY OF THE INVENTION

The present invention is directed to a leak detector arrangement of the above-mentioned kind which operates with a single turbo vacuum pump and a forepump, so that it is less expensive than prior art arrangements requiring a turbo vacuum pump and, in addition, another high vacuum pump with a forepump.

Accordingly, an object of the present invention is to provide a leak detector for discovering leaks in a vacuum vessel by means of testing for the presence of a test gas which has penetrated into the vessel from the outside, comprising, a turbo vacuum pump having its inlet connected to a gas detector for detecting the test gas and its outlet connected to a forepump, with a connecting line provided for supplying the test gas evacuated from the vessel to be tested to the turbo pump, the connecting line terminating at an intermediate stage of the turbo vacuum pump, between its inlet and outlet.

Since, in accordance with the invention, only a part of the turbo vacuum pump is used as a counter-current pump, the risk was run that as compared to the prior art arrangements, the pressure ratio of test gas pressure to total pressure in the detector will be greater by orders of magnitude and, consequently, that the interference background caused by the total pressure and, particularly, by the pressure variations in the test vessel, will be much stronger. Surprisingly, however, it has been found that this loss of detecting sensitivity, to be expected theoretically, does not occur. Presumably, in the prior art arrangements, a temporary hight test gas peak causes a gas absorption in the oil present in the bearings on the pressure side of the turbo vacuum pump and of the forepump, which absorbed gas is then only slowly released again. In the inventive arrangement, however, the partial pressure portion thereof is suppressed or made ineffective by the interconnected intermediate stages of the turbo vacuum pump which is not used as a counter-current pump. The inventive solution has, therefore, substantially the following two advantages:

1. The time constant for regaining full sensitivity after a test gas peak is reduced in proportion to the pumping speeds of the residual stages of the turbo vacuum pump used for evacuating the tested vessel, and of the forepump.
2. The high pressure side of the pump section evacuating the detector to the turbo vacuum pump remains securely free from hydrocarbons having a capacity of absorbing the test gas, i.e., the so-called memory effect of the forepump remains ineffective, so that, with the inventive arrangement, the detecting sensitivity of the prior art devices may even be surpassed.

Another object of the present invention is to provide a leak detector which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic block diagram of the leak detecting device for testing a vacuum vessel, according to the invention.

DESCRIPTION OF THE PREFERRED EMBODIMENT

In the following, one embodiment of the invention is exlained in more detail with reference to the accompanying single diagrammatical figure showing a turbo vacuum pump, generally designated 1, a detector 2 (for example, a quadrupole mass spectrometer) connected to the inlet thereof for detecting the test gas, the outlet side 3 of the pump, and a forepump 7 connected thereto through a line 6, a valve 5, and a connection 4.

Further shown is a connecting line 8 for conducting the test gas from a vessel 9 to be tested, which line, in accordance with the invention, terminates in an intermediate stage between the inlet and the outlet of the turbo vacuum pump. Vessel 9 is exposed at its outside to the test gas.

Most advantageously, line 6 terminates at a location where the compression ratio, relative to the inlet of the pump, for the interfering gases (air) is just sufficient to maintain an optimum operating vacuum in the detector, for example, if a mass spectrometer is used as the detector, a vacuum of the order of magnitude of $10^{-5}$ millibar. This requirement at the same time determines the minimum compression ratio for the interfering gases in a specific instance. It is further advantageous to join the connecting line 8 so as to open into an annular channel 10 provided in the housing of pump 1 and surrounding the respective stage thereof, in order to best utilize the suction capacity of this stage.

The drawing further shows a valve 11 with which line 8 may be shut off, for example, to be able to exchange the vessel 9 to be tested without the necessity of venting the entire pump. Also shown is a line 12 with a shutoff valve 13, permitting the establishment of a direct communication between the tested vessel and the forepump. This is to make possible a direct, thus faster, preliminary evacuation of the test vessel by means of forepump 7, for creating the operating condition.

Within the context of this specification, a turbo vacuum pump means a vacuum pump which a motion impulse is transmitted to the gas to be displaced in the displacement direction by rapidly rotating elements such as blades or rotary discs. Thus, in this specification, the mentioned term covers both turbo vacuum pumps operating in the viscous flow range and such displacing the gases at low pressures within the range of molecular flow. In this latter case, the impulses are transmitted by each rotary element to every individually displaced molecule and such pumps are then frequently termed turbo molecular pumps.

By pumping stages, the individual blade rings or discs of a turbo vacuum pump are meant which, when in rotary motion, displace the gas in the pumping direction, while compressing it by a definite factor. It may be advantageous to design the individual pumping stages with different compression capacities, e.g., those pumping stages which operate as a counter-current pump with a lower compression capacity and the other stages with a higher compression capacity, for better separation relative to the forepump. The two different sets of discs are then mounted on a common shaft and in a common pump housing. Such a turbo vacuum pump is particularly suitable for the application of the invention. Blades or discs 15 are thus upstream of the annular channel 10 and discs 16 (of the second set of discs) are downstream thereof in the direction of arrow 17 which is the operating flow direction of pump 1.

While a specific embodiment of the invention has been shown and described in detail to illustrate the application of the principles of the invention, it will be understood that the invention may be embodied otherwise without departing from such principles.

What is claimed is:

1. A leak detector, for detecting leaks in a vacuum vessel by means of a test gas penetrating into the vessel from outside the vessel, comprising:
    a single turbo vacuum pump having an inlet, an outlet and a plurality of stages between the inlet and outlet for moving fluid in an operating flow direction;
    a detector for detecting the presence of the test gas connected to said turbo vacuum pump inlet;
    a forepump connected to said turbo vacuum pump outlet for removing fluid from said turbo vacuum pump; said turbo vacuum pump having an intermediate inlet positioned at a stage of said turbo vacuum pump intermediate said inlet and outlet thereof; and
    a vacuum vessel connecting line connected between said intermediate inlet and connectable to a vacuum vessel to be tested for supplying test gas through said intermediate inlet to said turbo vacuum pump and to said detector in counter-current flow to the operating direction of said turbo vacuum pump.

2. A leak detector, according to claim 1, wherein said turbo vacuum pump includes a housing having an annular channel surrounding the intermediate stage of said turbo vacuum pump adjacent said intermediate inlet, said intermediate inlet communicating with said annular channel.

3. A leak detector, according to claim 1, wherein said tubro vacuum pump includes at least two sets of discs having mutually different compression capacities mounted on a common shaft and accommodated in a common housing, said intermediate inlet provided between said two sets of discs.

4. A leak detector, according to claim 1, including a valve connected between said forepump and said outlet, a second connecting line connected between said first-mentioned connecting line and said forepump, a second valve in said second connecting line and a third valve in said first connecting line between a point thereon adapted to receive a vacuum vessel to be tested and said intermediate inlet.

5. A leak detector, according to claim 1, wherein said test gas detector comprises a mass spectrometer.

6. A leak detector according to claim 1, consisting essentially of said single turbo vacuum pump, said forepump, said detector and said vacuum vessel.

* * * * *